United States Patent [19]
Jacobson

[11] Patent Number: 4,930,947
[45] Date of Patent: Jun. 5, 1990

[54] TOOL HOLDER

[75] Inventor: Mark Jacobson, Davisburg, Mich.

[73] Assignee: M.L.S. Detroit, Inc., Troy, Mich.

[21] Appl. No.: 354,868

[22] Filed: May 30, 1989

[51] Int. Cl.⁵ .................................. B23B 31/04
[52] U.S. Cl. ........................ 408/153; 279/1 TE; 408/173; 408/179
[58] Field of Search ............ 408/150, 153, 173, 179, 408/231, 232, 233, 239 A; 279/1 TE, 6, 71, 83

[56] References Cited

U.S. PATENT DOCUMENTS

| | | | |
|---|---|---|---|
| 3,557,419 | 1/1971 | Flannery | 279/83 |
| 3,691,883 | 9/1972 | Ingram | 279/83 |
| 4,265,057 | 5/1981 | Hoffman | 279/83 |
| 4,776,734 | 10/1988 | Buettiker et al. | 408/150 |

FOREIGN PATENT DOCUMENTS 2031764 4/1980 United Kingdom ........... 408/239 A

Primary Examiner—Daniel Howell
Attorney, Agent, or Firm—Gifford, Groh, Sprinkle, Patmore and Anderson

[57] ABSTRACT

A tool holder is disclosed having a body adapted to be rotatably driven about an axis. The body includes an axial bore at one end which is adapted to receive the cylindrical shank of a cutting tool. A radial bore in the body receives a threaded fastener which, upon tightening, abuts against the cutting tool shank to secure the shank to the tool holder body. A pair of alignment members are adjustably secured to the body and each alignment member has an alignment surface which is substantially tangent to the axial bore whereas each alignment member is shaped so that the radial distance between the alignment surface on the alignment member and the axis of the tool holder varies in dependence upon the position of the alignment member. Adjustment of the alignment members and fastener centers the cutting tool to the tool holder.

7 Claims, 1 Drawing Sheet

U.S. Patent  Jun. 5, 1990  4,930,947
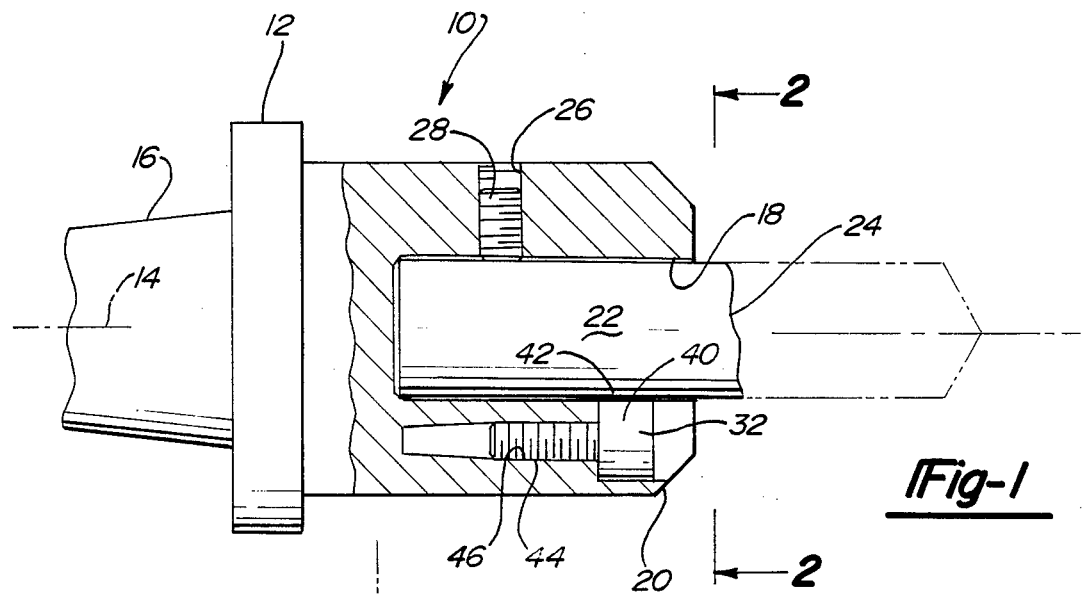
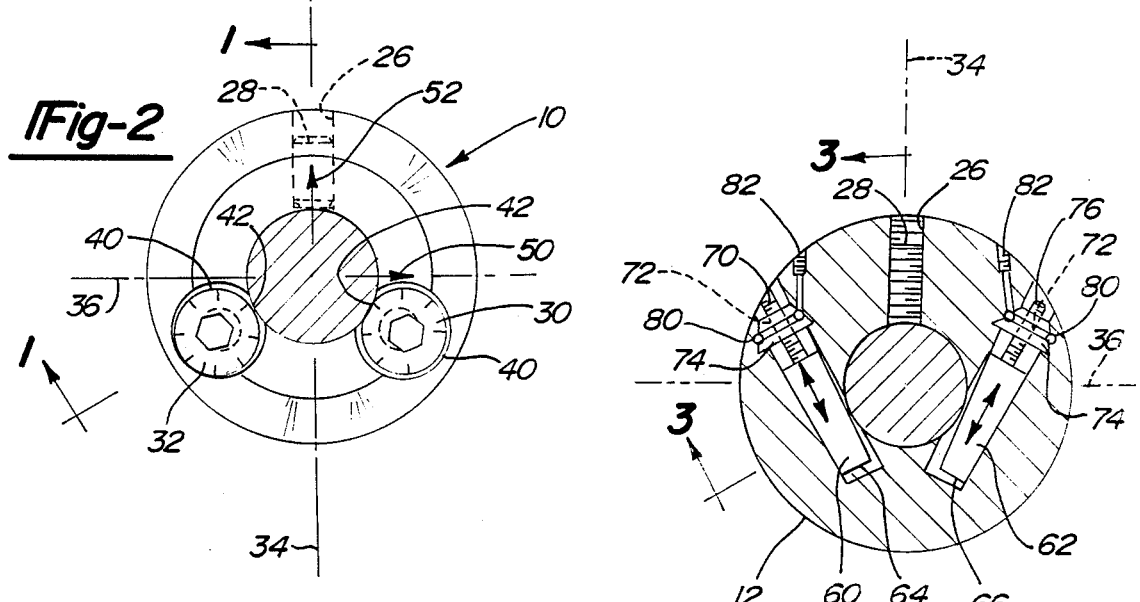
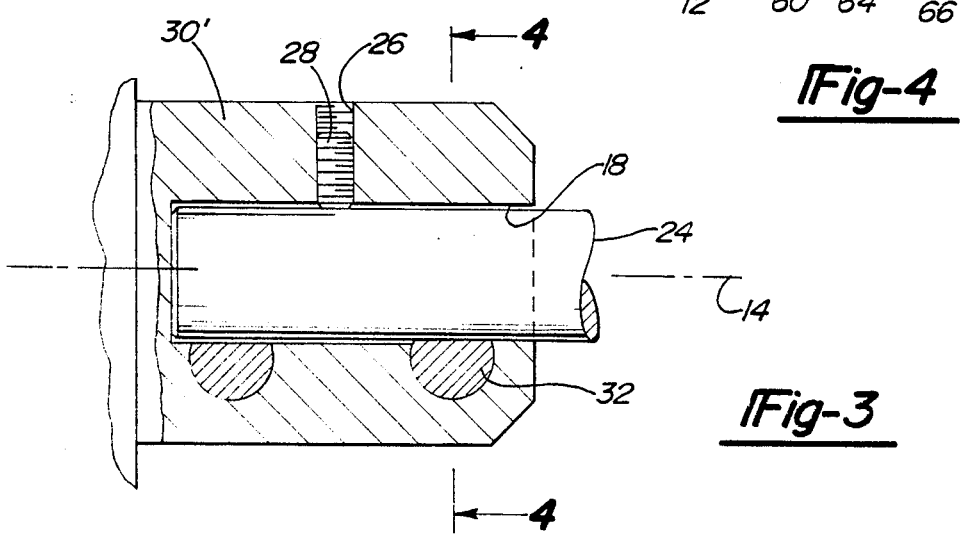

TOOL HOLDER

BACKGROUND OF THE INVENTION

I. Field of the Invention

The present invention relates generally to tool holders.

II. Description of the Prior Art

The previously known tool holders typically comprise an elongated body which is generally cylindrical in crossectional shape. An axial bore is formed in one end of the body and the body is adapted to be rotatably driven about this axis.

The shank of a cutting tool is positioned within the axial bore so that the cutting tool extends generally axially outwardly from one end of the tool holder body. A radial threaded bore is also provided in the body which intersects the axial bore and receives a threaded fastener. Upon tightening of the fastener, the fastener abuts against the shank of the cutting tool and secures the cutting tool to the tool holder body.

Although the axial bore is dimensioned to tightly receive the shank of the cutting tool, of necessity there must be some clearance between the cutting tool shank and its receiving bore on the tool holder body. Consequently, once the threaded fastener is tightened to secure the cutting tool to the tool holder body, the shank of the cutting tool is necessarily forced slightly off center from the axis of the tool holder. Tightening of the threaded fastener also causes slight radial elongation of the tool holder body along the axis of the radial bore.

The above shortcomings of the previously known tool holders all result in "run out" during a machining process using the tool holder. While this run out may be minor and is acceptable for many applications, such run out is unacceptable for other high precision applications. For example, many such high precision applications are found in the aircraft industry.

SUMMARY OF THE PRESENT INVENTION

The present invention provides a tool holder which overcomes the above mentioned disadvantages of the previously known devices.

In brief, the tool holder of the present invention comprises an elongated and generally cylindrical body having a longitudinal axis. The body is adapted to be rotatably driven about its axis by any conventional rotary drive machine.

An axial bore is formed in one end of the body and this axial bore is dimensioned to receive the shank of a cutting tool. A radially threaded bore is also provided in the tool holder body which intersects the axial bore and receives a threaded fastener. Upon tightening of the threaded fastener, the fastener abuts against the shank of the cutting tool and secures the cutting tool to the tool holder in the conventional fashion.

Unlike the previously known tool holders, however, the present invention further comprises a pair of alignment members which are adjustably secured to the tool holder body. Each alignment member includes an alignment surface which is substantially tangent to the axial bore. In addition, the alignment members are provided on opposite sides of a plane bisecting both the axial bore and the radial bore and are also on the opposite side of a plane from the radial bore which bisects the axial bore and is substantially perpendicular to the radial bore.

The alignment members are each shaped so that adjustment of each alignment member varies the radial distance between the longitudinal axis of the tool holder and the alignment surface on the alignment member. Consequently, adjustment of the alignment members in conjunction with adjustment of the threaded fastener radially displaces the shank of the cutting tool until the longitudinal axis of the cutting tool is aligned with the longitudinal axis of the tool holder.

In one embodiment of the invention, each alignment member comprises a cam having a cam surface which forms the alignment member surface. In a second embodiment of the invention, each alignment member comprises a wedge wherein the inclined surface of the wedge forms the alignment surface of the alignment member.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a longitudinal sectional view taken substantially along line 1—1 in FIG. 2 and illustrating a preferred embodiment of the present invention;

FIG. 2 is an axial end view taken substantially along line 2—2 in FIG. 1;

FIG. 3 is a longitudinal sectional view taken substantially along line 3—3 in FIG. 4 and which is similar to FIG. 1 but illustrating a second preferred embodiment of the present invention; and FIG. 4 is a cross-sectional view taken substantially along line 4—4 in FIG. 3.

DETAILED DESCRIPTION OF PREFERRED EMBODIMENTS OF THE PRESENT INVENTION

With reference first to FIGS. 1 and 2, a first preferred embodiment of the tool holder 10 of the present invention is thereshown and comprises an elongated body 12 having a longitudinal axis 14. One end 16 of the body 12 is adapted to be inserted into the chuck of a rotary drive machine (not shown) which rotatably drives the tool holder 10 about its longitudinal axis 14.

An axially extending bore 18 is provided in the opposite or free end 20 of the tool holder body 12 so that the bore 18 is coaxial with the axis 14 of the tool holder body 12. The axial bore 18 is adapted to receive the shank 22 of a cutting tool 24 in the conventional fashion.

A radial bore 26 is also provided in the tool holder body 12 so that the radial bore 26 radially intersects the axial bore 18. The bore 26 is internally threaded and is adapted to threadably receive a threaded fastener 28. With the cutting tool shank 22 positioned in the bore 18, tightening of the fastener 28 secures the cutting tool 24 and tool holder 10 together in the well known fashion.

Still referring to FIGS. 1 and 2, a pair of alignment members 30 and 32 are provided to correct run out of the cutting tool 24. The alignment members 30 and 32 are provided on opposite sides of a plane 34 (FIG. 2) which axially bisects both the axial bore 18 and the radial bore 26. Additionally, the alignment members 30 and 32 are provided on the opposite side from the radial bore 26 of a plane 36 which axially bisects the axial bore 18 but is perpendicular to the axis of the radial bore 26. Preferably, the alignment members 30 and 32 and the radial bore 26 are spaced 120° apart from each other.

The alignment members 30 and 32 shown in FIGS. 1 and 2 are in the form of cams so that each alignment member 30 and 32 has an outer cam or alignment surface 40 having a portion 42 which is substantially tangential to the axial bore 18. However, since the surfaces 40 are cam surfaces, the distance between the tangential portion 42 of the alignment members 30 and 32 and the axis 14 of the bore 18 varies in dependence upon the rotational position of the alignment members 30 and 32. The actual distance between the tangential surface 42 of the alignment members 30 and 32 and the axis 14 of the tool holder bore 18 will typically vary between an amount equal to (or slightly greater than) the radius of the axial bore 18 and an amount slightly less than the radius of the bore 18.

Any conventional means can be employed to secure the alignment members 30 and 32 to the tool holder body 12 and still permit adjustment or rotation of the alignment members 30 and 32. However, as best shown in FIG. 2, each alignment member 30 and 32 (only alignment member 32 is shown) includes a threaded shank 44 which threadably engages a threaded hole 46 in the tool holder body 12. This threaded hole 46 is parallel to but radially offset from the axis 14 of the tool holder 10.

In operation, the shank 22 of the cutting tool 24 is inserted within the tool holder bore 18 and the fastener 28 is tightened to secure the cutting tool shank and tool holder 10 together. Conventional gauges are then used to determine both the amount and the direction of run out of the cutting tool 24.

Since the alignment members 30 and 32 are provided on the opposite side of the plane 36 from the threaded fastener 26 and are also provided on opposite sides of the plane 34 from each other, the cutting tool 24 can be radially displaced in any radial direction and in any radial amount (within the limits of the bore 18 and alignment members 30 and 32) by adjustment of the alignment members 30 and 32 together with the threaded fastener 28. For example, to move the cutting tool rightwardly as shown by arrow 50 in FIG. 2, the alignment 30 is rotated so that its alignment surface 42 retracts slightly from the bore 18 while the alignment member 32 is adjusted so that its alignment surface 42 protracts more inwardly into the bore 18. In doing so, the alignment member 32 effectively pushes the cutting tool shank 22 rightwardly as indicated by arrow 50.

Similarly, to move the cutting tool shank 22 radially towards the threaded fastener 28 as shown by arrow 52, the threaded fastener 28 is first loosened and then both alignment members 30 and 32 are adjusted so that their alignment surfaces protrude more radially inwardly into the bore 18. In doing so, the alignment members 30 and 32 push the cutting tool 24 radially towards the threaded fastener 28. These two examples are for illustration purposes only since proper adjustment of the alignment members 30 and 32 and threaded fastener 28 will produce movement in any radial direction.

With reference now to FIGS. 3 and 4, a further embodiment of the present invention is thereshown in which wedges 60 and 62 replace the cams 30 and 32 as the alignment members. As before, the wedges 60 and 62 are longitudinally slidably mounted within receiving channels 64 and 66 in the tool holder body 10. Each wedge 60 and 62 includes an alignment surface 42 which, like the embodiment of the invention shown in FIGS. 1 and 2, is substantially tangential to the bore 18. The longitudinal displacement of the wedges 60 and 62 in their respective channels 64 and 66, however, varies the radial distance between the axis 14 of the tool holder in the alignment surface 42 in order to correct for run out of the cutting tool.

Like the embodiment of the invention shown in FIGS. 1 and 2, the wedges 60 and 62 are positioned so that their alignment surface 42 i.e. the portion of the wedges 60 and 62 which is tangential to the bore 18 are on opposite sides of the plane 34 which axially bisects both the bore 18 and the radial bore 26. Similarly, the alignment surfaces 42 are on the opposite side from the radial bore 26 of a plane 36 which axially bisects the bore 18 but is perpendicular to the radial bore 26. As before, the alignment surfaces 42 and bore 26 are preferably spaced apart 120° from each other.

Referring now particularly to FIG. 4, any conventional means can be used to vary the longitudinal position of the wedges 60 and 62 in their receiving channels 64 and 66. However, as illustrated, each wedge 60 and 62 includes a threaded shank 70 which is threadably received within a threaded bore 72 of a dial 74. Each dial 74 is rotatably mounted to the tool holder body 12 but constrained against axial movement by ball bearings 80 in a ball bearing race formed between the dial 74 and the tool holder body 12. A fill hole 82 is used to insert the ball bearings 80 within their ball bearing race after the dial 74 is positioned in place.

Rotation of each dial 74 longitudinally displaces its associated wedge 60 or 62 within their channels 64 and 66. This in turn varies the distance between their alignment surfaces 42 and the axis 14 of the bore 18. Consequently, run out of the cutting tool can be corrected in the same fashion as discussed for the FIG. 1 and FIG. 2 embodiment so that a further discussion thereof is unnecessary.

With reference now to FIG. 3, a still further modification to the present invention is thereshown. More specifically, when only two alignment members 30 and 32 are provided on the tool holder, some cocking of the cutting tool shank 22 with respect to the body of the tool holder is still possible. Consequently, in order to eliminate such cocking, a further pair of alignment members 30' and 32' (only 32' is illustrated) are provided in the tool holder but at a position axially spaced from the first pair of alignment members 30 and 32. Additionally, as shown in FIG. 3, the second pair of alignment members are axially arranged with respect to the first alignment members 32 so that the axis of the radial bore 26 extends midway in between the two sets of alignment members 30, 32 and 30', 32'.

The alignment members 30' and 32' are substantially identical to the wedges 60 and 62 shown in FIG. 4 so that a further description thereof is unnecessary.

From the foregoing, it can be seen that the present invention provides a simple and yet totally effective means for eliminating runout of a cutting tool in a tool holder.

Having described my invention, however, many modifications thereto will become apparent to those skilled in the art to which it pertains without deviation from the spirit of the invention as defined by the scope of the appended claims.

I claim:
1. A tool holder comprising:
   a body having an axis and adapted to be rotatably driven about said axis,
   said body having an axial bore in one end adapted to receive the shank of a cutting tool, said body having a threaded radial bore which intersects said axial bore, a threaded fastener in said radial bore which, upon tightening, abuts against the cutting tool shank to secure said cutting tool to said body, a pair of alignment members, each member having a surface substantially tangent to said axial bore, said members being on opposite sides of a plane axially bisecting both the axial bore and the radial bore and on the opposite side from the radial bore of a second plane axially bisecting the axial bore and perpendicular to the axis of the radial bore, wherein each alignment member is shaped so that the radial distance between said alignment surface on the alignment member and said axis varies in dependence upon the position of the alignment member with respect to the body, said alignment members comprising in addition at least one cam rotatably mounted to said body about an axis parallel to and radially spaced from said axial bore in said body, said cam having a cam surface which forms said alignment member surface, means for independently adjusting the position of each alignment member.

2. The invention as defined in claim 1 wherein the radial distance between said alignment member surface and said axis varies between an amount equal to the radius of the axial bore and an amount smaller than the radius of the axial bore in dependence upon the position of the alignment member.

3. The invention is defined in claim 1 wherein each alignment member comprises a cam.

4. A tool holder comprising:

a body having an axis and adapted to be rotatably driven about said axis, said body having an axial bore in one end adapted to receive the shank of a cutting tool, said body having a threaded radial bore which intersects said axial bore, a threaded fastener in said radial bore which, upon tightening, abuts against the cutting tool shank to secure said cutting tool to said body, a pair of alignment members, each member having a surface substantially tangent to said axial bore, said members being on opposite sides of a plane axially bisecting both the axial bore and the radial bore and on the opposite side from the radial bore of a second plane axially bisecting the axial bore and perpendicular to the axis of the radial bore, said alignment surface having a portion substantially tangential to said axial bore, wherein the distance between each of said tangential portions of said alignment members and said axis of said axial bore varies in dependence upon the position of said alignment members, means for independently adjusting the position of each alignment member wherein adjustment of said adjusting means moves said tangential portion in a tangential direction with respect to said bore.

5. The invention as defined in claim 4 wherein said alignment members comprise wedges, said wedges being movably mounted in a direction substantially tangential to said axial bore, said wedges having inclined surfaces which form said alignment surfaces.

6. The invention as defined in claim 4 wherein said pair of alignment members are positioned adjacent said one end of said body and further comprising a second pair of alignment members mounted to said body at a position axially spaced from said end of said body, said second alignment members being on opposite sides of a plane axially bisecting said axial bore and said radial bore and having a surface substantially tangent to said axial bore, wherein said second alignment members are shaped so that the distance between said axis and said alignment surface on said second alignment members varies in dependence upon the position of said second alignment members.

7. The invention as defined in claim 6 wherein each second alignment member comprises a wedge.

* * * * *